United States Patent [19]

Gohara et al.

[11] Patent Number: 5,674,459
[45] Date of Patent: Oct. 7, 1997

[54] HYDROGEN PEROXIDE FOR FLUE GAS DESULFURIZATION

[75] Inventors: Wadie F. Gohara; Dennis W. Johnson, both of Barberton, Ohio

[73] Assignee: The Babcock & Wilcox Company, New Orleans, La.

[21] Appl. No.: 648,261

[22] Filed: May 15, 1996

Related U.S. Application Data

[63] Continuation of Ser. No. 303,311, Sep. 8, 1994, Pat. No. 5,595,713.

[51] Int. Cl.[6] .................................. B01D 50/00
[52] U.S. Cl. .................. 422/170; 422/172; 422/189; 423/242.2; 423/243.01; 261/115; 55/228; 55/229
[58] Field of Search .................. 422/170, 171, 422/172, 176, 189; 423/222, 243.01, 242.1, 242.2; 261/108, 111, 115, 117, 118; 55/223, 228, 229

[56] References Cited

U.S. PATENT DOCUMENTS

| | | | |
|---|---|---|---|
| 3,473,297 | 10/1969 | Tamura et al. | 55/73 |
| 3,503,704 | 3/1970 | Marks | 33/2 |
| 3,617,567 | 11/1971 | Mathre | 210/50 |
| 3,617,582 | 11/1971 | Lawes et al. | 210/63 |
| 3,704,569 | 12/1972 | Hardison et al. | 55/4 |
| 3,722,178 | 3/1973 | Aaland et al. | 55/4 |
| 3,733,393 | 5/1973 | Couillaud et al. | 423/215 |
| 3,760,061 | 9/1973 | Hammond | 423/242 |
| 3,896,209 | 7/1975 | Fournier et al. | 423/55 |
| 3,907,523 | 9/1975 | Melin, Jr. | 55/73 |
| 3,917,798 | 11/1975 | Konopik et al. | 423/242 |
| 3,953,578 | 4/1976 | Thirion | 423/242 |
| 3,991,167 | 11/1976 | Depommier et al. | 423/393 |
| 3,998,714 | 12/1976 | Armstrong | 210/62 |
| 4,035,296 | 7/1977 | Armstrong | 210/151 |
| 4,045,347 | 8/1977 | Armstrong | 210/199 |
| 4,153,628 | 5/1979 | Gerken et al. | 423/531 |
| 4,158,702 | 6/1979 | Archer | 423/210 |
| 4,204,955 | 5/1980 | Armstrong | 210/61 |
| 4,239,711 | 12/1980 | Dick et al. | 261/109 |
| 4,249,916 | 2/1981 | Dick et al. | 55/73 |
| 4,250,152 | 2/1981 | Biedell et al. | 423/242 |
| 4,263,021 | 4/1981 | Downs et al. | 55/73 |
| 4,301,127 | 11/1981 | Goodstine et al. | 423/242 |
| 4,322,392 | 3/1982 | Gleason et al. | 423/242 |
| 4,351,804 | 9/1982 | Biedell et al. | 422/170 |
| 4,377,557 | 3/1983 | Lowell | 423/242 |
| 4,419,331 | 12/1983 | Montalvo | 422/170 |
| 4,423,018 | 12/1983 | Lester, Jr. et al. | 423/243 |

(List continued on next page.)

FOREIGN PATENT DOCUMENTS

| | | | |
|---|---|---|---|
| 958871 | 12/1974 | Canada | 23/341 |
| 0178507 | 9/1985 | European Pat. Off. | G01N 31/00 |
| 0 259 533 | 9/1986 | European Pat. Off. | C23G 1/02 |
| 670966 | 1/1939 | Germany | 12/25 |
| 1234912 | 2/1967 | Germany . | |
| 48-15766 | 2/1973 | Japan . | |
| 84113484.4 | 11/1984 | South Africa | B01D 53/34 |
| 930584 | 1/1962 | United Kingdom . | |
| 930584 | 7/1963 | United Kingdom | 41/1 |
| 1 499 536 | 2/1978 | United Kingdom | B01D 53/34 |

OTHER PUBLICATIONS

Johnstone & Coughaner, "Absorption of Sulfur Dioxide from Air", *Industrial and Engineering Chemistry*, vol. 50, No. 8, Aug. 1958, pp. 1169–1173.

(List continued on next page.)

*Primary Examiner*—Christopher Kim
*Attorney, Agent, or Firm*—Robert J. Edwards; Eric Marich

[57] ABSTRACT

A system for removing $SO_2$, $NO_2$, and other contaminants from flue gases uses hydrogen peroxide ($H_2O_2$) as the reagent to convert the oxides of sulfur and some of the oxides of nitrogen (NO, $NO_2$, etc.) to more stable oxidation states. Acids formed as a result of this conversion, namely sulfuric acid ($H_2SO_4$) and nitric acid ($HNO_3$) can then be neutralized with limestone or, alternatively, the sulfuric and nitric acids can be collected and processed for sale as an industrial product.

18 Claims, 6 Drawing Sheets

U.S. PATENT DOCUMENTS

| | | | |
|---|---|---|---|
| 4,454,101 | 6/1984 | Garrison et al. | 423/242 |
| 4,462,968 | 7/1984 | Tazuma et al. | 423/224 |
| 4,484,937 | 11/1984 | James et al. | 55/223 |
| 4,539,184 | 9/1985 | Stehning | 422/170 |
| 4,609,386 | 9/1986 | Sibley et al. | 55/223 |
| 4,678,481 | 7/1987 | Diep | 55/4 |
| 4,818,506 | 4/1989 | Lin et al. | 423/242 |
| 4,822,577 | 4/1989 | Epperly et al. | 423/243 |
| 4,836,991 | 6/1989 | Ishiguro et al. | 423/242 |
| 4,853,195 | 8/1989 | Lehto | 423/242 |
| 4,861,568 | 8/1989 | Robinson, Jr. | 423/243 |
| 4,931,262 | 6/1990 | Sonta et al. | 423/220 |
| 4,931,269 | 6/1990 | Lailach et al. | 423/522 |
| 4,954,148 | 9/1990 | Alexander, Sr. | 55/223 |
| 4,968,335 | 11/1990 | Fujimoto et al. | 55/223 |
| 5,015,450 | 5/1991 | Koslowski | 423/172 |
| 5,049,198 | 9/1991 | Ribas | 106/739 |
| 5,160,707 | 11/1992 | Murray et al. | 422/170 |
| 5,246,471 | 9/1993 | Bhat et al. | 55/223 |
| 5,417,946 | 5/1995 | Chou et al. | 423/210 |
| 5,424,044 | 6/1995 | Kalka | 422/171 |
| 5,518,696 | 5/1996 | Jain | 422/171 |

OTHER PUBLICATIONS

Coates, Tracy J., "$NO_x$ Absorption form Air Streams Using Aqueous Solutions". Prepared for presentation at AIChE Summer National Meeting, Aug. 1987, Advances in $NO_x$ Scrubbing, Session No. 9, Jul. 1987. Entire paper.

Saxena, P. & Seigneur, C., "On the Oxidation of $SO_2$ to Sulfate in Atmospheric Aerosols". *Atmospheric Environment*, vol. 21, No. 4, 1987, pp. 807–812.

Deo, "The Use of Hydrogen Peroxide for the Control of Air Pollution". Interox Research & Development. pp. 275–292. Date Unknown.

HYDROGEN PEROXIDE FOR FLUE GAS DESULFURIZATION

This is a continuation of application Ser. No. 08/303,311 filed Sep. 8, 1994 U.S. Pat. No. 5,595,713.

FIELD AND BACKGROUND OF THE INVENTION

The present invention relates in general to systems for removing contaminants from flue gases using a reagent and, in particular, to a new and useful system for removing $SO_2$, $NO_2$, and other contaminants from flue gases using hydrogen peroxide ($H_2O_2$) as the reagent.

The flue gas produced during fossil fuel combustion and metallurgical ore refining is responsible for a significant portion of the $SO_2$ emitted to the atmosphere. When gaseous $SO_2$ combines with liquid water, a dilute aqueous solution of sulfurous acid ($H_2SO_3$) is produced. Sulfurous acid readily oxidizes in the atmosphere to sulfuric acid ($H_2SO_4$) which, together with nitric acid ($HNO_3$), comprises the major acidic constituents of acid rain. Acid rain has caused considerable damage to lakes and forests in the Northeastern portion of North America and in the Black Forest region of Europe.

Legislative action has been responsible for most industrial $SO_2$ controls and a variety of $SO_2$ control processes and technologies have been developed in response thereto. Commercialized processes include wet, semi-dry (slurry spray with drying) and completely dry processes. Of these, the wet $SO_2$ scrubber has been the dominant worldwide technology to control $SO_2$ emissions from utility power plants; dry flue gas desulfurization (FGD) plants have also played a significant role.

Certain disadvantages are present in such commercially available FGD systems. The disposal of reaction products is still a concern in both wet and dry FGD systems. Power consumption requirements are significant, both to grind and prepare the reagent materials and to spray same into the flue gas. Many pieces of equipment are involved in such systems and the erosive properties of the reagent, such as limestone or lime, result in periodic maintenance and replacement of many components. While both wet and dry scrubber systems can achieve adequate $SO_2$ removal efficiencies, high ratios of reagent to gas flow are often required.

The use of hydrogen peroxide to desulfurize flue gas is well known in the art. Commercially feasible installations are not commonplace for a variety of reasons.

SUMMARY OF THE INVENTION

One aspect of the present invention is drawn to a system for removing sulfur dioxide, nitrogen dioxide and other contaminants from a flue gas using hydrogen peroxide. The system comprises a vertical tank reaction chamber having an inlet at a lower end thereof for receiving the flue gas. Distribution means are located in a lower portion of the reaction chamber for distributing the flue gas throughout a level of liquid reaction products and unused reagent within the reaction chamber to provide an initial desulfurization and removal of contaminants from the flue gas. A plurality of weirs are located in an upper portion of the reaction chamber to effect desulfurization and removal of other contaminants from the flue gas as it is bubbled vertically upwards through the weirs. Means are provided for supplying hydrogen peroxide to the weirs located in the upper portion of the reaction chamber to produce liquid reaction products and unused reagent as the flue gas is bubbled vertically upwards through the weirs. Means for transporting liquid reaction products and unused reagent from the weirs to the lower portion of the reaction chamber provide the level of liquid therein. Means are provided for removing the liquid reaction products and unused reagent from the lower portion of the reaction chamber to maintain the level of liquid at a desired value. Finally, means are provided for discharging the flue gas from the upper portion of the reaction chamber.

Another aspect of the present invention is drawn to a system for removing sulfur dioxide, nitrogen dioxide and other contaminants from a flue gas using hydrogen peroxide, having a particularly designed horizontal reaction chamber having a diverging inlet section for receiving the flue gas, a relatively constant cross-sectional area middle section, and converging outlet section for discharging the flue gas. A staggered array of hydrogen peroxide spray headers are located within said horizontal reaction chamber and arranged to spray hydrogen peroxide and/or liquid reaction products and unused reagent into the flue gas to desulfurize and denitrify same. A sump is provided at the bottom of the reaction chamber for collecting liquid reaction products and unused reagent formed by the reaction of the flue gas with the hydrogen peroxide. Means are provided for controlling a level of said liquid reaction products and unused reagent in said reaction chamber bottom by discharging excess amounts of said liquid reaction products and unused reagent into a holding tank. Finally, means connected to said holding tank, are provided for recycling said liquid reaction products and unused reagent from said holding tank to said staggered array of hydrogen peroxide spray headers.

Yet another aspect of the present invention is drawn to a system for removing sulfur dioxide, nitrogen dioxide and other contaminants from a flue gas using hydrogen peroxide, having a pretreating chamber for removing ash particles and other contaminants. The pretreating chamber has a diverging inlet section for receiving the flue gas, a relatively constant cross-sectional area middle section, and a converging outlet section for discharging the flue gas. Means, located within said pretreating chamber, are provided for cooling the flue gas as it passes therethrough to a desired temperature range. A horizontal reaction chamber is connected to the outlet section of said pretreating chamber for receiving said discharged flue gas, said horizontal reaction chamber having a diverging inlet section for receiving the discharged flue gas, a relatively constant cross-sectional area middle section, and a converging outlet section for discharging the flue gas. A staggered array of hydrogen peroxide spray headers is located within said horizontal reaction chamber and arranged to spray hydrogen peroxide and/or liquid reaction products and unused reagent into the flue gas to desulfurize and denitrify same. A sump is provided at the bottom of the reaction chamber for collecting liquid reaction products and unused reagent formed by the reaction of the flue gas with the hydrogen peroxide. Means are provided for controlling a level of said liquid reaction products and unused reagent in said reaction chamber bottom by discharging excess amounts of said liquid reaction products and unused reagent into a holding tank. Finally, means, connected to said holding tank, are provided for recycling said liquid reaction products and unused reagent from said holding tank to said staggered array of hydrogen peroxide spray headers.

Yet still another aspect of the present invention is drawn to a combined wet scrubber and hydrogen peroxide flue gas desulfurization system for removing sulfur dioxide, nitrogen dioxide and other contaminants from a flue gas. This system comprises a vertical wet scrubber module having a flue gas side inlet, an array of reagent slurry spray headers, and an outlet for discharging the flue gas from the module into outlet flue work connected to and downstream of said module outlet. Means are provided for supplying reagent slurry to said headers to cause the slurry to spray into the flue gas to desulfurize same. An array of mist eliminators is located in the outlet flue work. Means are provided for washing said mist eliminators with hydrogen peroxide and/or liquid reaction products and unused reagent to further desulfurize the flue gas and to denitrify same as the flue gas passes across said mist eliminators. Means are also provided for collecting liquid reaction products and unused reagent which has washed said mist eliminators, which are used in combination with means for recycling the liquid reaction products and unused reagent back over the mist eliminators. Optionally, a tray can be located in an upper portion of said module to enhance mixing.

The various features of novelty which characterize the invention are pointed out with particularity in the claims annexed to and forming a part of this disclosure. For a better understanding of the invention, its operating advantages and specific results attained through its uses, reference is made to the accompanying drawings and descriptive matter wherein preferred embodiments of the invention are illustrated.

DESCRIPTION OF THE PREFERRED EMBODIMENTS

The drawings forming a part of this description are provided to illustrate the application of the principles of the invention without limiting its scope. Like numerals designate the same or functionally similar elements throughout the several drawings.

One aspect of the present invention is drawn to a system for removing $SO_2$, $NO_2$, and other contaminants from flue gases using hydrogen peroxide ($H_2O_2$) as the reagent or, more specifically, as an oxidant to convert the oxides of sulfur and some of the oxides of nitrogen (NO, $NO_2$, etc.) to more stable oxidation states. Acids formed as a result of this conversion, namely sulfuric acid ($H_2SO_4$) and nitric acid ($HNO_3$), can then be neutralized with limestone in an isolated area or enclosure away from populated areas. Alternatively, depending on the demand and purity of the acid products themselves, the sulfuric and nitric acids can be collected and processed for sale as an industrial product, enhancing the economic feasibility of the present system. The following simplified chemical reactions represent the processes involved in both the creation of the contaminants and their removal through the use of hydrogen peroxide:

(1)

(2)

(3)

(4)

(5)

(6)

As will be described later, another aspect of the present invention involves using hydrogen peroxide as an oxidizing agent to convert the calcium sulfite ($CaSO_3 \cdot \tfrac{1}{2}H_2O$) produced in a wet scrubbing process to calcium sulfate ($CaSO_4 \cdot 2H_2O$), also known as gypsum. The following simplified chemical reactions represent the processes involved in a wet scrubbing process to convert calcium sulfite ($CaSO_3 \cdot \tfrac{1}{2}H_2O$) calcium sulfate ($CaSO_4$):

(7)

(8)

In wet scrubbing processes, various natural or forced oxidation processes using air (the latter usually accomplished in an oxidizing tank) have been developed to enhance conversion of calcium sulfite ($CaSO_3 \cdot \tfrac{1}{2}H_2O$) to calcium sulfate ($CaSO_4 \cdot 2H_2O$). In addition to being a more stable product, calcium sulfate, or gypsum, has widespread use as the main constituent of wallboard used in the construction industry. The present invention contemplates use of hydrogen peroxide as the oxidizing agent to facilitate the conversion of calcium sulfite to calcium sulfate. Using hydrogen peroxide eliminates the need for sparge air and the associated power consumption (air compressors, etc.) normally present with forced air oxidation.

Figure 1:
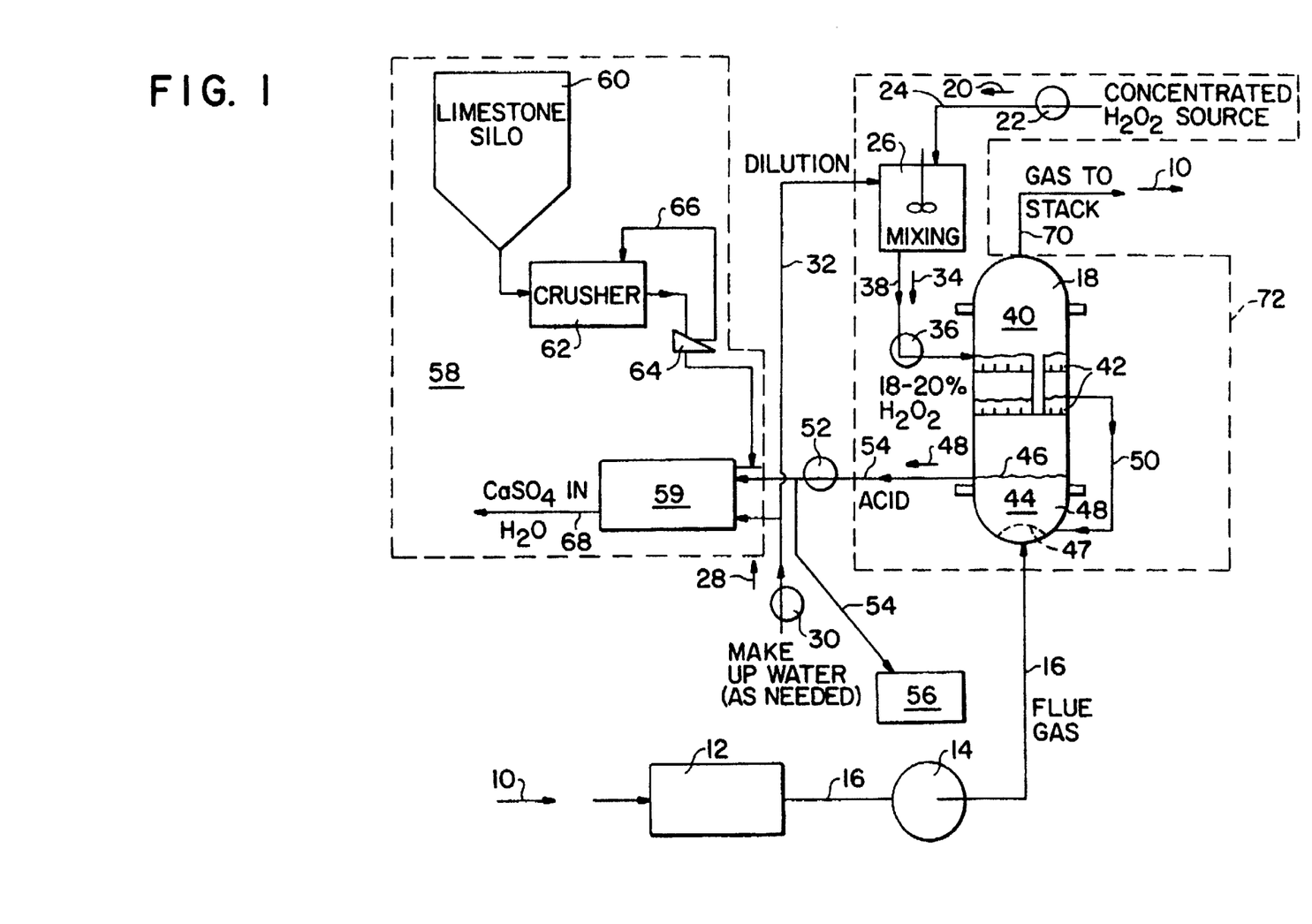
FIG. 1 is a schematic representation of a first embodiment of the invention.

FIG. 1 discloses a schematic representation of a first embodiment of the present invention. Flue gas 10 containing particulates, sulfur oxides ($SO_2$, etc.), nitrogen oxides ($NO_2$, etc.), and other contaminants is produced by a combustion process (not shown) involving a fossil fuel such as coal, oil or gas. The flue gas 10 is provided to particle collection means 12, which collects the majority of the particulates entrained in the flue gas. Particle collection means 12 is typically a precipitator, baghouse, or a Venturi scrubber, depending upon the amount of particulates in the flue gas and the degree of removal desired. Induced draft (ID) fan 14 receives the cleaned flue gas 10 and delivers it by means of flue work 16 to a reaction chamber 18 where the chemical reactions between the hydrogen peroxide and the $SO_2$, $NO_2$, and other contaminants take place. As shown in FIG. 1, one embodiment of the reaction chamber 18 comprises a vertical tank or scrubber module, similar to those used in wet scrubber systems, wherein the reagent, typically a slurry of limestone products, is introduced into the flue gas. Other forms of the reaction chamber 18 will be described later.

Hydrogen peroxide 20, is provided from a source by means of a pump 22 and associated piping 24 to a mixing tank 26. The source concentration of the hydrogen peroxide 20 is typically 25 to 50%, which provides a sufficient starting point for dilution as needed by the process. Water 28 for diluting the 25 to 50% hydrogen peroxide 20 is provided by means of a pump 30 and associated piping 32 to mixing tank 26. The incoming 25 to 50% source hydrogen peroxide 20 is diluted to a strength of 18-20%. Diluted hydrogen peroxide 34 is taken from the mixing tank 26 by means of pump 36 and associated piping 38 to the reaction chamber 18.

The 18-20% hydrogen peroxide 34 is provided into an upper portion 40 of reaction chamber 18 to contacting means such as a plurality of weirs, packing or trays 42. The high reactivity the hydrogen peroxide 34 permits the simple approach of weirs or trays 42 to expose the flue gas 10 to the hydrogen peroxide 34, which literally bubbles vertically upwards through bubble caps in the trays 42. This eliminates the need for elaborate spray header and nozzle arrangements typically used in wet scrubber type installations wherein a lime or limestone slurry is injected and finely atomized via expensive, erosion-resistant nozzles. The expense for periodic replacement of such nozzles due to erosion is thus greatly reduced.

The amount of hydrogen peroxide 34 provided to the reaction chamber 18 is determined by the amount of incoming flue gas 10 entering a lower portion 44 of the reaction chamber 18. For most applications, the reagent to gas ratio L/G would lie within a range of approximately 1 to 30. L/G is defined as the amount of reagent supplied, measured in gallons per minute, divided by the amount of flue gas treated, in actual cubic feet per minute, with the resulting quotient being multiplied by 1000. A level 46 of liquid reaction products, i.e., dilute sulfuric and nitric acid and unused reagent, hereinafter referred to as dilute acid 48, is maintained in lower portion 44 of the reaction chamber 18, and the flue gas 10 is bubbled vertically upwards through this liquid to provide a first stage of initial desulfurization and removal of other contaminants. The level 46 is provided by hydrogen peroxide 34 transported by external piping 50 to the lower portion 44, and may be taken from the weirs or trays 42 or directly from the pump 36 (not shown). Distribution means 47, such as a perforated plate or the like, are used to distribute the flue gas 10 throughout the liquid dilute acid 48 in the lower portion 44. Again, this arrangement whereby the flue gas 10 is bubbled up through a liquid level 46 to provide for a first stage of initial desulfurization and removal of other contaminants is quite different from conventional wet scrubber installations using a lime slurry reagent. In such wet scrubbers, while a level of liquid reagent is maintained in the bottom of an absorber module, the flue gas enters the module at a location above the liquid level, proceeding up through an arrangement of spray headers and absorber trays.

The dilute acid 48 is taken from reaction chamber 18 by means of a pump 52 and associated piping 54 to maintain level 46 at a desired value. The dilute acid 48 can then be either transferred via piping 54 to acid collection means 56 for use, further processing, or sale as a commercial product, or neutralized with limestone to form commercial wallboard grade gypsum ($CaSO_4 \cdot 2H_2O$) of nearly 100% purity.

Neutralization of the dilute acid 48 to create the gypsum occurs in acid neutralizing/gypsum production subsystem 58. Subsystem 58 comprises a mill 59, advantageously a pug mill, connected to the pump 52 and associated piping 54. A limestone source 60 provides limestone to a crusher 62 connected to feeder means 64 for transporting the crushed limestone to the mill 59. Particles of limestone exceeding a desired size are returned via returning means 66 to the crusher 62. The product 68 leaving the mill 59 is typically in the range of approximately 70-80% gypsum (calcium sulfate, ($CaSO_4 \cdot 2H_2O$)) and water.

The system disclosed in FIG. 1 could also be modified to provide for only one of either the acid collection means 56 or the acid neutralizing/gypsum production subsystem 58, without departing from the principles of the present inventions.

The treated flue gas proceeds up through the upper portion 40 of the reaction chamber 18 and leaves the reaction chamber 18 by means of flue work 70 which directs the flue gas 10 to a stack (not shown) for discharge into the atmosphere. Due to the corrosive nature of the dilute acid 48 produced, as well as the highly oxidative nature of the hydrogen peroxide 20, 34, the various structural components coming into contact with same should be made of corrosion and/or oxidation resistant materials. The general region that would require such precautions is shown schematically in FIG. 1 by dashed area 72. Typical constructions could involve: glass-lined or fiberglass lined equipment; stainless steel or alloy steel equipment; or plastic or rubber linings when permitted by applicable design codes, and temperature or pressure requirements.

Figures 2, 3:
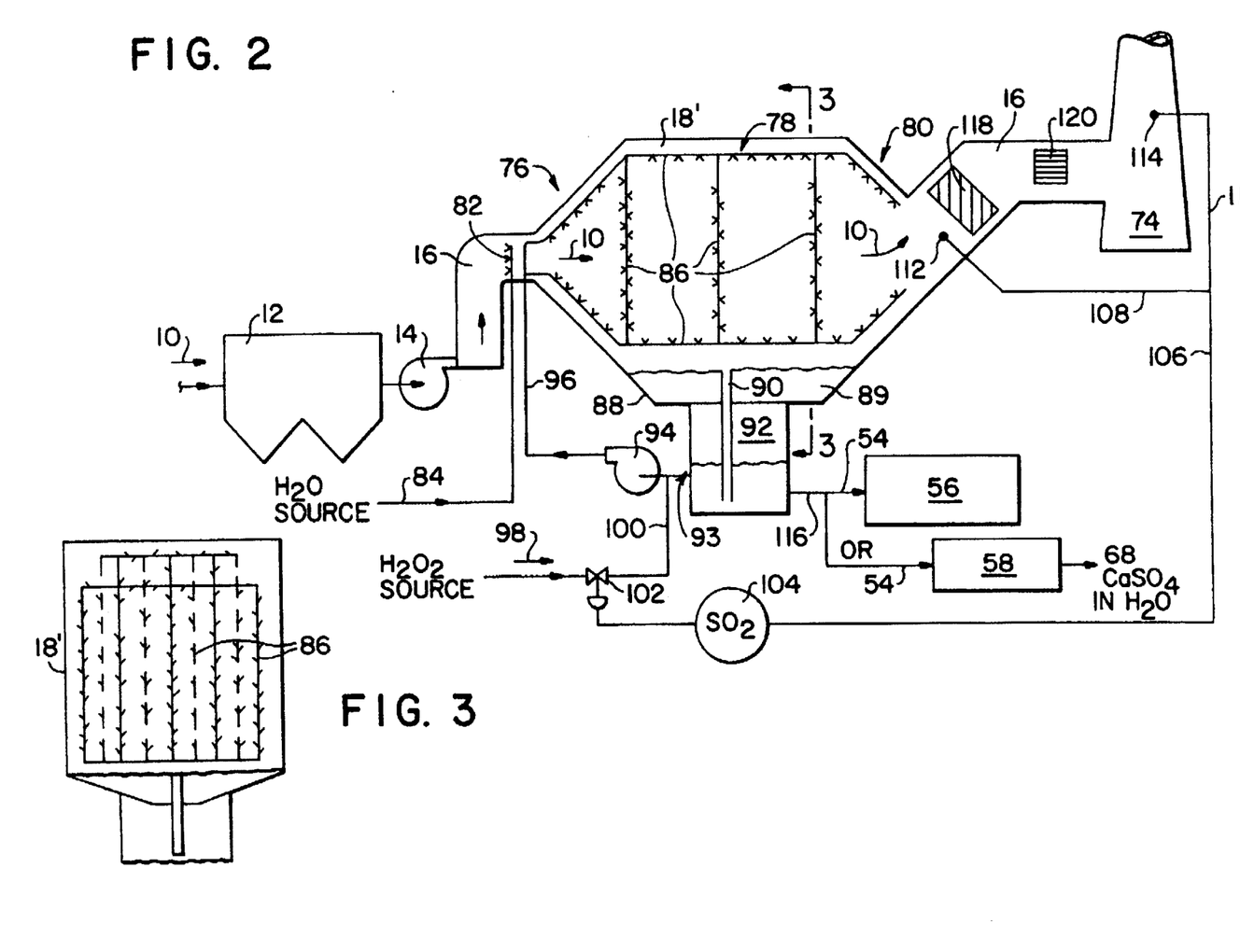
FIG. 2 is a schematic representation of a second embodiment of the invention.
FIG. 3 is a sectional view taken along Line A—A of FIG. 2, showing a schematic representation of the hydrogen peroxide spray headers within the reaction chamber 18' of the invention.

FIGS. 2 and 3 disclose a schematic representation of a second embodiment of the present invention, drawn particularly to the form of the reaction chamber where the flue gas 10 is desulfurized. As discussed earlier in connection with FIG. 1, flue gas 10 containing particulates, sulfur oxides ($SO_2$, etc.), nitrogen oxides ($NO_2$, etc.) and other contaminants is produced by combustion (not shown) of a fossil fuel such as coal, oil, or natural gas, or of a waste fuel such as sour gas (methane containing $H_2S$), refuse, or refuse derived fuel where the refuse has been processed to a greater or lesser degree prior to combustion. The flue gas 10 is provided to particle collection means 12, which collects the majority of the particulates entrained in the flue gas. Particle collection means 12 is typically a precipitator, baghouse, or a Venturi scrubber, depending upon the amount of particulates in the flue gas and the degree of removal desired. Induced draft (ID) fan 14 delivers the cleaned flue gas 10 by means of flue work 16 to a reaction chamber 18' where the chemical reactions between the hydrogen peroxide and/or recirculated dilute acid (as discussed later), and the $SO_2$ and $NO_2$ take place.

As shown in FIG. 2, the flue gas 10 flows horizontally through reaction chamber 18'. This is in contrast to the embodiment of FIG. 1 wherein the flue gas 10 flows vertically upward through reaction chamber 18. Reaction chamber 18' comprises an enlargement in the flue work 16 extending between ID fan 14 and a stack 74. If necessary, further particle collection means (not shown) could be installed downstream of the reaction chamber 18' and before the stack 74 if the flue gas 10 particulate concentration still exceeds applicable limits. This might be particularly true if low efficiency collection means 12, such as a Venturi scrubber, were employed. Reaction 35 chamber 18' has a diverging inlet section 76, a relatively constant cross-sectional area middle section 78, and a converging outlet section 80.

Reaction chamber 18' is sized to obtain a desired flue gas velocity through the middle section 78 within a range of 5-50 feet per second. The upper limit is merely the typical value used to size flue work 16 between the ID fan 14 and the stack 74, which is a compromise between acceptable draft losses and the cost of the flue work 16 to obtain same. The lower limit is based upon those flue gas velocities presently used in conventional wet or dry scrubbers; wet scrubbers typically employing flue gas velocities in the 10-15 feet per second range, while dry scrubbers typically employing flue gas velocities in the 5-10 feet per second range. The actual velocities for a particular installation would be determined by the reactivity of the hydrogen peroxide (which being high would allow the designer to tolerate higher velocities), the type and efficiency of moisture collection devices downstream of the reaction chamber 18', and the space limitations for the installation of the reaction chamber 18'.

Directly upstream of reaction chamber 18' are one or more devices, such as water spraying headers 82 connected to a water source 84, for providing water directly into the flue gas 10. This water will serve to cool and humidify the flue gas 10 to desired levels, if necessary. If humidification is not necessary, but cooling of the flue gas 10 is still required, any form of conventional heat exchanger (not shown) can be provided to cool the flue gas 10.

Inside reaction chamber 18' is a staggered array of hydrogen peroxide spray headers 86 arrayed to spray hydrogen peroxide and/or recirculated dilute acid (the reaction product as will be discussed later) into the flue gas 10 to desulfurize it. The number and size of headers 86 will be determined by the amount of hydrogen peroxide and/or dilute acid required. Again, for most applications, the reagent to gas ratio L/G would lie within a range of approximately 1 to 30. The high reactivity of the hydrogen peroxide will permit relatively unsophisticated spray nozzle designs to be employed; however, a dual fluid atomizer such as is disclosed in U.S. Pat. No. 4,819,878 could be employed if extremely fine atomization was desired. Preferably, spray nozzles where the droplet size could be easily adjusted to suit conditions in the field would be employed.

A sump 88 is provided at the bottom of the reaction chamber 18' to collect liquid reaction products, i.e., dilute sulfuric and nitric acid and unused reagent, hereinafter referred to as dilute acid 89. Level in the sump 88 is controlled by level controlling means 90, typically an overflow pipe, which discharges into a holding tank 92, preferably located directly below the reaction chamber 18'. Two discharge streams are provided from the holding tank 92. The first stream connects to a pump 94 and associated piping 96 to recycle the dilute acid 89 to the hydrogen peroxide spray headers 86. Fresh hydrogen peroxide 98, again at 25 to 50% strength, can be provided from a source by means of piping 100 to pump 94. An automatically controlled valve 102, located in piping 100 and under the control of an $SO_2$ monitoring and controlling device 104, modulates the flow of fresh hydrogen peroxide to pump 94 as required. Controlling device 104 is connected by lines 106, 108, 110 to suitable $SO_2$ and/or $NO_x$ concentration sensors 112, 114 of known construction located at either or both of an outlet of the reaction chamber 18' and the stack 74.

The second stream 116 discharging from holding tank 92 could again be directed as described earlier in connection with FIG. 1, namely, sent via piping 54 to acid collection means 56 for use, further processing, or sale as a commercial product, or sent via piping 54 to acid neutralizing/gypsum production subsystem 58 where it would be neutralized with limestone to form high purity commercial wallboard grade gypsum ($CaSO_4 \cdot 2H_2O$).

As the flue gas 10 exits the reaction chamber 18', it passes across the $SO_2$ and/or $NO_x$ concentration sensor 112, a mist eliminator 118, a stack gas reheater 120, and $SO_2$ and/or $NO_x$ concentration sensor 114 before exiting the stack 74. The mist eliminator 118 would preferably be an arrangement of baffles, such as a chevron or mesh pad arrangement, on which moisture in the flue gas 10 will collect for return to the sump 88. The stack gas reheater 120 adds heat to the flue gas 10, if necessary, to satisfy stack gas draft requirements.

Figure 4:
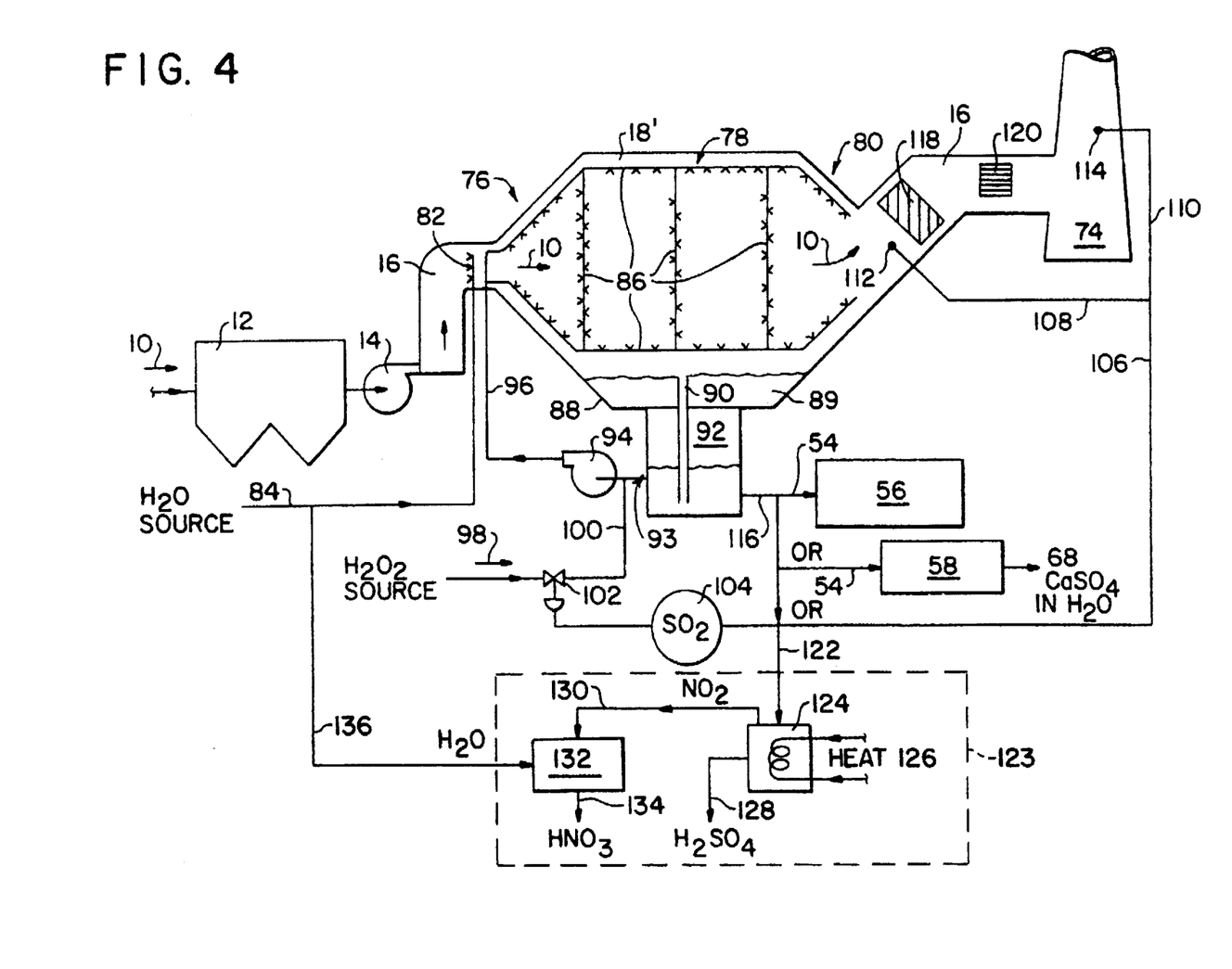
FIG. 4 is a schematic representation of a third embodiment of the present invention, used to produce sulfuric and nitric acid from the reaction products.

FIG. 4 discloses a schematic representation of a third embodiment of the present invention, a variant of that disclosed in FIGS. 2 and 3, used to produce sulfuric and nitric acid from the reaction products. In this embodiment, the second stream 116 discharging from holding tank 92 could be directed via piping 122 to a sulfuric acid/nitric acid production subsystem 123 comprising heating tank 124 and associated heating means 126 where any nitrogen oxides as $NO_2$ could be driven off to produce a higher grade sulfuric acid 128. The nitrogen oxides could then be conveyed by piping 130 to tank 132 where they would be dissolved in water to produce nitric acid 134. The water provided to tank 132 could be supplied via piping 136 from the same source providing water 84 for the water spraying header 82.

The system disclosed in FIG. 4 could be modified to provide for only one or more of the acid collection means 56, the acid neutralizing/gypsum production subsystem 58, or the sulfuric acid/nitric acid production subsystem 123 without departing from the principles of the present invention.

Figure 5:
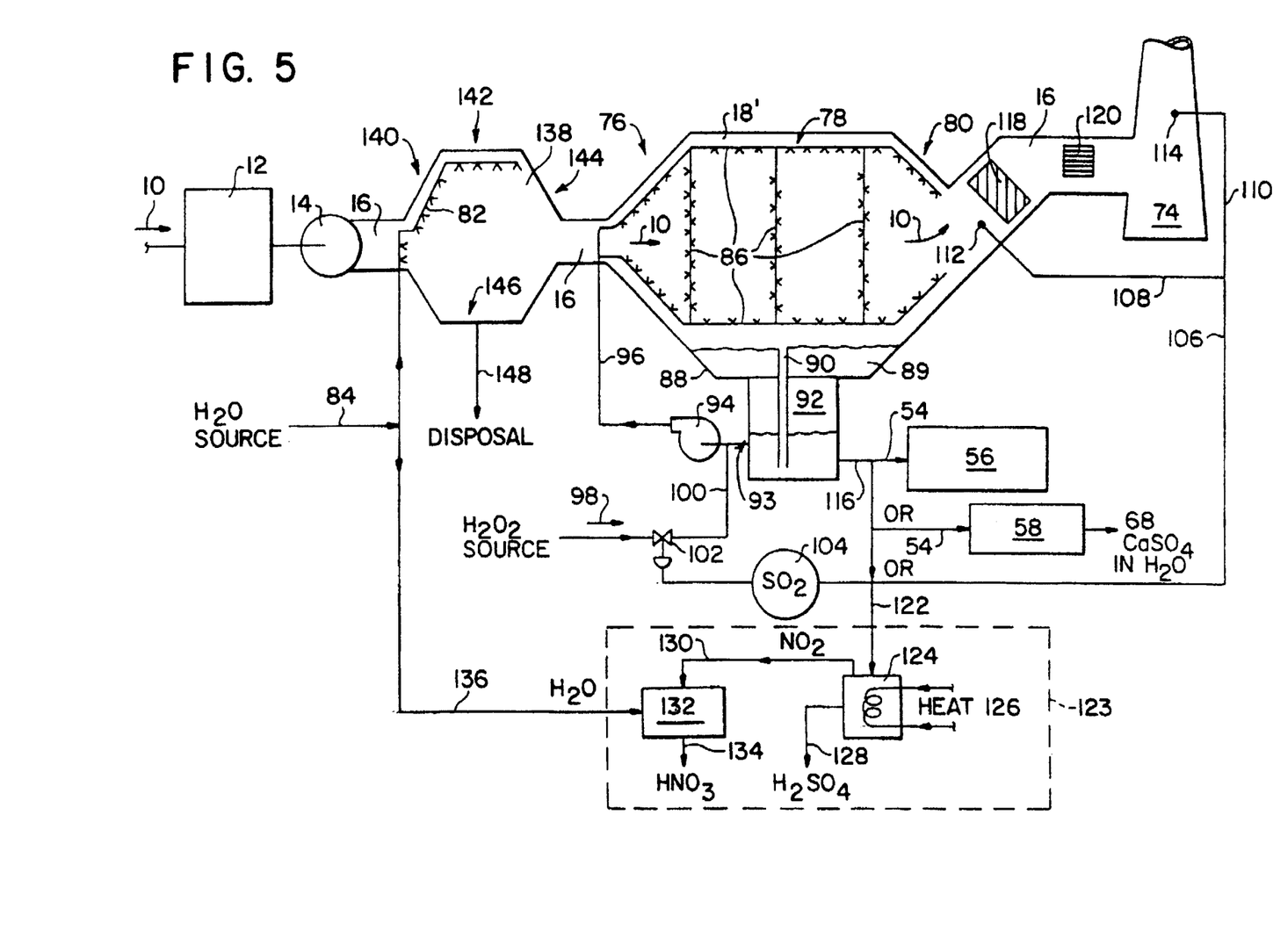
FIG. 5 is a schematic representation of a fourth embodiment of the present invention, particularly useful for pretreating the flue gas by means of a water spray to extract additional ash particles and other contaminants, such as heavy metals, etc. from the flue gas before it is subjected to desulfurization according to the invention.

FIG. 5 discloses a schematic representation of B fourth embodiment of the present invention, particularly useful for extracting additional ash particles and other contaminants, such as heavy metals, etc. from the flue gas 10 before it is treated in the reaction chamber 18'. As shown therein, an additional pretreating chamber 138 is disposed in the flue work 16, downstream of the ID fan 14 and just upstream of the reaction chamber 18'. Directly within the pretreating chamber 138 are the one or more water spraying headers 82 connected to a water source 84 for providing water directly into the flue gas 10. These water spraying headers 82 have been relocated from being directly upstream of the reaction chamber 18' and are distributed throughout the pretreating chamber 138 as required. Water is sprayed into pretreating chamber 138 to remove any remaining dust particles in the flue gas 10 and to cool and humidify the flue gas 10, to an appropriate temperature to provide the water necessary to satisfy the process water balance. The shape of the pretreating chamber 138 is similar to that of the reaction chamber 18', having a diverging inlet section 140, a relatively constant cross-sectional area middle section 142, and a converging section 144. Pretreating chamber 138 would also be sized in a manner similar to that used for reaction chamber 18', namely to obtain a desired flue gas velocity through the middle section 142 within a range of 5-50 feet per second. Water and collected particles would be collected at a bottom portion 146 of the pretreating chamber 138 and removed for disposal by drain 148.

Figure 6:
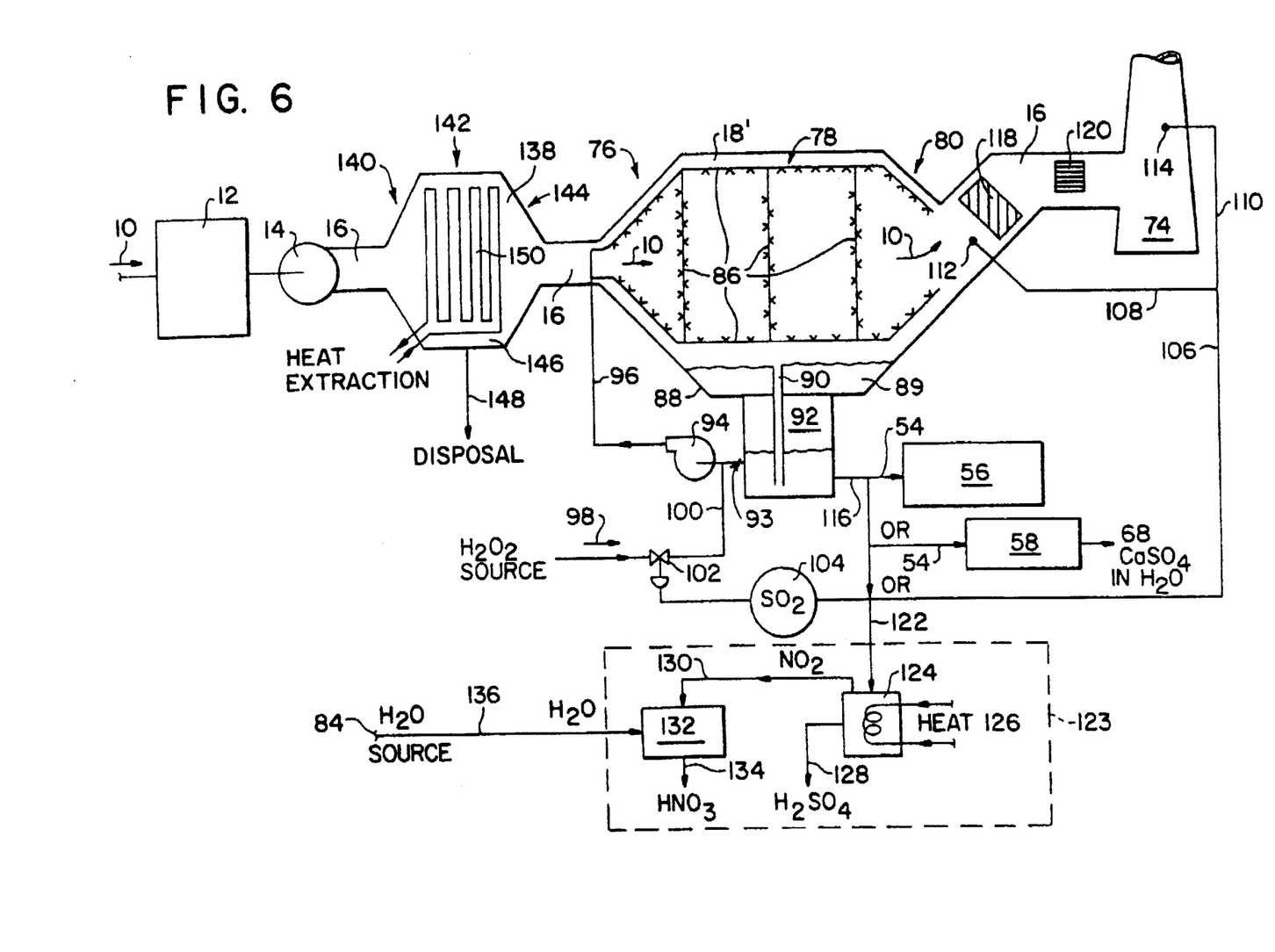
FIG. 6 is a schematic representation of a fifth embodiment of the invention, a variation of the embodiment of FIG. 5, wherein the pretreating of the flue gas involves a condensing heat exchanger to remove heat from the flue gas to lower its temperature and produce more concentrated sulfuric acid from the same process without further heating.

Alternatively, if the water content in the flue gas 10 is adequate, direct contact spraying of water into the flue gas 10 would be unnecessary. As disclosed in FIG. 6, in this situation 20 pretreating chamber 138 would only be required to cool the flue gas 10, again preferably to approximately 30° F. above the saturation temperature of the flue gas 10, and would then contain a condensing heat exchanger 150 to remove heat from the flue gas 10 and lower its temperature.

Figure 7:
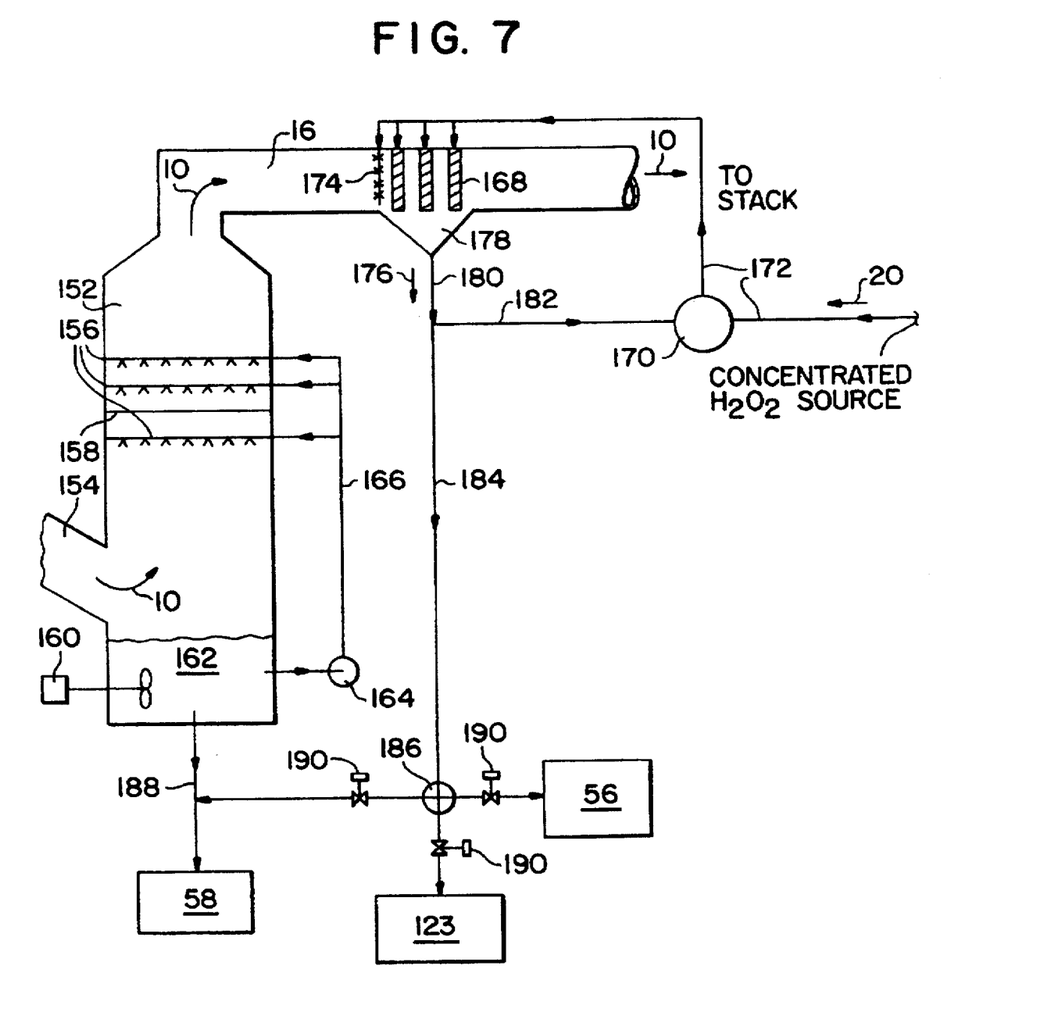
FIG. 7 is a schematic representation of a sixth embodiment of the invention, drawn to a system for washing a mist eliminator, used in combination with a wet scrubber module, with hydrogen peroxide for further $SO_2$ removal at a more reduced operating cost than the previous embodiments.

Another aspect of the present invention is disclosed in FIG. 7, which is drawn to a system for washing a mist eliminator, used in combination with a wet scrubber module, with hydrogen peroxide for further $SO_2$ removal. A conventional wet scrubber module 152 is provided with flue gas 10 at a side inlet 154. The flue gas 10 flows upwardly through an array of lime or limestone reagent slurry spray headers 156 and a tray 158 for removal of sulfur dioxide, in a manner known to those skilled in the art. Mixers 160 keep a quantity of lime or limestone feed reagent slurry 162 agitated in the bottom of the wet scrubber 35 module 152. A recirculation pump 164 provides the lime or limestone reagent slurry via piping 166 to the lime or limestone reagent slurry spray headers 156. It is understood, of course, that other reagents besides or in addition to the aforementioned lime or limestone could be used to produce the reagent slurry provided to these reagent slurry spray headers; lime or limestone was used for the sake of convenience in describing the basic principles of the invention.

In a conventional wet scrubber module 152, mist eliminators are placed in an upper portion to remove moisture and entrained particles from the flue gas 10 before it exits the module 152. However, in the present invention, mist eliminators 168, which are oriented substantially vertically, are placed in the flue work 16 leading to the stack (not shown). These mist eliminators 168 are washed by a spray of hydrogen peroxide 20 from a source by means of a pump 170 and associated piping 172. In addition, an upstream hydrogen peroxide spray header 174 is provided just upstream of the mist eliminators 168 to further reduce the sulfur dioxide in the exiting flue gas 10. Liquid reaction products, i.e., dilute sulfuric and nitric acid and unused reagent, hereinafter referred to as dilute acid 176, are collected in collecting means 178 and over the mist eliminators 168 by means of pump 170 and associated piping 180, 182, for further reaction with the flue gas 10. A portion of the dilute acid 176 is conveyed via piping 184 to another pump 186 (if required) for transfer to one of the three end uses as described in connection with the earlier embodiments, namely the acid collection means 56, the acid neutralizing/ gypsum production subsystem 58 (connected to blowdown line 188 on the scrubber module 152), or the sulfuric acid/nitric acid production subsystem 123. Suitable valves 190 would, of course, be provided as the needs of a particular system require, being again understood that the system disclosed in FIG. 7 could be modified to provide for only one or more of the acid collection means 56, the acid neutralizing/gypsum production subsystem 58, or the sulfuric acid/nitric acid production subsystem 123 without departing from the principles of the present invention.

The advantages of the embodiment of FIG. 7 are several. The dilute acid 176 or hydrogen peroxide 20 used to wash the mist eliminators 168 also serves to keep them clean. The high reactivity of the hydrogen peroxide 20 would permit sulfur dioxide collection efficiencies for the entire wet scrubber system to approach 99% at a low $H_2O_2$ L/G ratio. The gypsum produced should be of extremely high quality and the production of such salable products, including the sulfuric and nitric acid, further enhances the economics of the system. The use of such a dual reagent system allows for greater flexibility in fuel pollutant content because the hydrogen peroxide stage can pick up any "slack" in the wet scrubber module 152 stage, allowing greater operation flexibility. The combined use of limestone and hydrogen peroxide allows the cheap reagent, limestone, to remove the bulk of the $SO_2$ at a low L/G which results in low operating costs. The hydrogen peroxide will act as a polishing reagent to remove the last traces of $SO_2$ which typically requires high energy costs to remove.

While specific embodiments of the invention have been shown and described in detail to illustrate the application of the principles of the invention, it will be understood that the invention may be embodied otherwise without departing from such principles.

We claim:

1. A system for removing sulfur dioxide, nitrogen dioxide and other contaminants from a flue gas using hydrogen peroxide, comprising:

a horizontal reaction chamber having a diverging inlet section for receiving the flue gas, a relatively constant cross-sectional area middle section, and a converging outlet section for discharging the flue gas;

a staggered array of hydrogen peroxide spray headers located within said horizontal reaction chamber and arranged to spray hydrogen peroxide and/or liquid reaction products and unused reagent into the flue gas to desulfurize and denitrify same;

a sump provided at the bottom of the reaction chamber for collecting liquid reaction products and unused reagent formed by the reaction of the flue gas with the hydrogen peroxide;

means for controlling a level of said liquid reaction products and unused reagent in said reaction chamber bottom by discharging excess amounts of said liquid reaction products and unused reagent into a holding tank;

means for controlling introduction of fresh hydrogen peroxide into the horizontal reaction chamber as a function of measured sulfur dioxide or nitrogen dioxide concentration in the flue gas downstream of said chamber;

means for collecting said liquid reaction products and unused reagent from said holding tank for use, further processing, or sale as a commercial product; and means, connected to said holding tank, for recycling said liquid reaction products and unused reagent from said holding tank to said staggered array of hydrogen peroxide spray headers.

2. The system of claim 1, further including an acid neutralizing/gypsum production subsystem for neutralizing liquid reaction products and unused reagent discharged from the holding tank with limestone to form commercial wallboard grade gypsum.

3. The system of claim 1, further including a sulfuric acid/nitric acid subsystem for receiving liquid reaction products and unused reagent discharged from the holding tank and processing same to produce high grade sulfuric acid and nitric acid.

4. The system of claim 3, wherein the sulfuric acid/nitric acid subsystem comprises:

means for transporting said liquid reaction products and unused reagent to a heating tank;

means for heating said liquid to drive off any nitrogen oxides as $NO_2$ to produce a higher grade sulfuric acid; and means for dissolving the nitrogen oxides in water to produce nitric acid.

5. The system of claim 1, further including one or more water spraying headers located directly upstream of the horizontal reaction chamber to provide water directly into the flue gas to cool and humidify same.

6. The system of claim 1, wherein sufficient hydrogen peroxide is provided to the horizontal reactor chamber to produce a reagent to gas ratio L/G within a range of approximately 1 to 30.

7. A system for removing sulfur dioxide, nitrogen dioxide and other contaminants from a flue gas using hydrogen peroxide, comprising:

a pretreating chamber for removing ash particles and other contaminants, having a diverging inlet section for receiving the flue gas, a relatively constant cross-sectional area middle section, and a converging outlet section for discharging the flue gas;

means, located within said pretreating chamber, for cooling the flue gas as it passes therethrough to a desired temperature range;

a horizontal reaction chamber connected to the outlet section of said pretreating chamber for receiving said discharged flue gas, said horizontal reaction chamber having a diverging inlet section for receiving the discharged flue gas, a relatively constant cross-sectional area middle section, and a converging outlet section for discharging the flue gas;

a staggered array of hydrogen peroxide spray headers located within said horizontal reaction chamber and arranged to spray hydrogen peroxide and/or liquid reaction products and unused reagent into the flue gas to desulfurize and denitrify same;

a sump provided at the bottom of the reaction chamber for collecting liquid reaction products and unused reagent formed by the reaction of the flue gas with the hydrogen peroxide;

means for controlling a level of said liquid reaction products and unused reagent in said reaction chamber bottom by discharging excess amounts of said liquid reaction products and unused reagent into a holding tank;

means for controlling introduction of fresh hydrogen peroxide into the horizontal reaction chamber as a function of measured sulfur dioxide or nitrogen dioxide concentration in the flue gas downstream of said chamber;

means for collecting said liquid reaction products and unused reagent from said holding tank for use, further processing, or sale as a commercial product; and means, connected to said holding tank, for recycling said liquid reaction products and unused reagent from said holding tank to said staggered array of hydrogen peroxide spray headers.

8. The system of claim 7, wherein the means located within said pretreating chamber for cooling the flue gas comprises one or more water spraying headers located within the pretreating chamber to provide water directly into the flue gas to remove any dust particles in the flue gas and to cool and humidify the flue gas.

9. The system of claim 7, wherein the means located within said pretreating chamber for cooling the flue gas comprises a condensing heat exchanger.

10. The system of claim 7, further including an acid neutralizing/gypsum production subsystem for neutralizing liquid reaction products and unused reagent discharged from the holding tank with limestone to form commercial wallboard grade gypsum.

11. The system of claim 7, further including a sulfuric acid/nitric acid subsystem for receiving liquid reaction products and unused reagent discharged from the holding tank and processing same to produce high grade sulfuric acid and nitric acid.

12. A combined wet scrubber and hydrogen peroxide flue gas desulfurization system for removing sulfur dioxide, nitrogen dioxide and other contaminants from a flue gas, comprising:

a wet scrubber module having a flue gas side inlet, an array of spray headers, and an outlet for discharging the flue gas from the module into outlet flue work connected to and downstream of said module outlet;

means for providing a desulfurizing reagent to said spray headers to cause the reagent to spray into the flue gas to desulfurize same;

an array of mist eliminators located in the outlet flue work;

means for washing said mist eliminators with hydrogen peroxide to further desulfurize the flue gas and to denitrify same as the flue gas passes across said mist eliminators;

means for controlling a level of said liquid reaction products and unused reagents in said wet scrubber module by discharging excess amounts of said liquid reaction products and unused reagents into a holding tank;

means for controlling the introduction of fresh hydrogen peroxide into the wet scrubber module as a function of measured sulfur dioxide or nitrogen dioxide concentration in the flue gas downstream of said wet scrubber module;

means for collecting liquid reaction products and unused hydrogen peroxide reagent produced during the washing of said mist eliminators;

means for transporting said liquid reaction products and unused reagent from said collecting means for use, further processing, or sale as a commercial product; and means for recycling the collected liquid reaction products and unused hydrogen peroxide reagent back over the mist eliminators for further reaction with the flue gas.

13. The system of claim 12, further including a vertical wet scrubber module.

14. The system of claim 12, further including a tray located in an upper portion of said module for enhancing mixing of the flue gas with the desulfurizing reagent.

15. The system of claim 12, wherein said mist eliminators are oriented substantially vertically.

16. The system of claim 15, further including an acid neutralizing/gypsum production subsystem for neutralizing liquid reaction products and unused reagent transported from said collecting means with limestone to form commercial wallboard grade gypsum.

17. The system of claim 12, wherein said desulfurizing reagent is a slurry of lime or limestone.

18. The system of claim 12, further including a sulfuric acid/nitric acid subsystem for receiving liquid reaction products and unused reagent transported from said collecting means and processing same to produce high grade sulfuric acid and nitric acid.

* * * * *